United States Patent
Hu et al.

(10) Patent No.: US 12,241,734 B2
(45) Date of Patent: Mar. 4, 2025

(54) FAULT PROCESSING SYSTEM FOR DISPLACEMENT SENSOR

(71) Applicant: GREE ELECTRIC APPLIANCES, INC. OF ZHUHAI, Zhuhai (CN)

(72) Inventors: Yusheng Hu, Zhuhai (CN); Weilin Guo, Zhuhai (CN); Yongling He, Zhuhai (CN); Daofu Hu, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 185 days.

(21) Appl. No.: 18/006,132

(22) PCT Filed: Jul. 27, 2021

(86) PCT No.: PCT/CN2021/108566
§ 371 (c)(1),
(2) Date: Jan. 19, 2023

(87) PCT Pub. No.: WO2022/134570
PCT Pub. Date: Jun. 30, 2022

(65) Prior Publication Data
US 2023/0288197 A1    Sep. 14, 2023

(30) Foreign Application Priority Data
Dec. 21, 2020    (CN) .......................... 202011523940.0

(51) Int. Cl.
G01B 21/04     (2006.01)
G01B 9/02055   (2022.01)
(Continued)

(52) U.S. Cl.
CPC ....... *G01B 21/047* (2013.01); *G01B 9/02055* (2013.01); *G01B 21/042* (2013.01);
(Continued)

(58) Field of Classification Search
CPC .... F16C 32/0442; F16C 32/0446; G05B 9/03; G01B 21/047; G01B 21/042;
(Continued)

(56) References Cited

U.S. PATENT DOCUMENTS

2003/0141772 A1 *  7/2003  Abel ................... F16C 32/0451
                                                       310/90.5
2004/0135576 A1 *  7/2004  Aizawa ................ G01D 5/2006
                                                       33/355 R
(Continued)

FOREIGN PATENT DOCUMENTS

CN     101173851 A     5/2008
CN     105066857 A    11/2015
(Continued)

OTHER PUBLICATIONS

Extended European Search Report mailed Nov. 11, 2023, issued in corresponding European Application No. EP 21908575, filed Jul. 27, 2021, 5 pages.

*Primary Examiner* — David M Schindler
(74) *Attorney, Agent, or Firm* — Christensen O'Connor Johnson Kindness PLLC

(57) ABSTRACT

A fault processing method for a displacement sensor includes: receiving a plurality of detected signals from a plurality of detecting probes and a given signal of a spare probe, wherein the detecting probes are configured to detect a displacement value of a rotation shaft of a magnetic levitation motor to obtain the detected signals, and the spare probe is configured to replace a faulty probe among the plurality of detecting probes; determining whether there is a faulty probe among the plurality of detecting probes based on the plurality of detected signals and the given signal; and connecting the given signal of the spare probe to the faulty probe corresponding to a case that a determination result is yes.

3 Claims, 5 Drawing Sheets

(51) Int. Cl.
*H02K 11/21* (2016.01)
*H02N 15/00* (2006.01)

(52) U.S. Cl.
CPC .......... *G01B 21/045* (2013.01); *H02K 11/21* (2016.01); *H02N 15/00* (2013.01)

(58) Field of Classification Search
CPC ........ G01B 21/16; G01B 21/02; G01B 7/133; G01B 7/107; G01B 21/045; G01B 9/02055; H02K 11/21; H02N 15/00; G01M 13/04; G01D 3/08; G01D 5/142; G01D 5/145; G01D 5/147; G01D 5/16; H02H 7/09
See application file for complete search history.

(56) References Cited

U.S. PATENT DOCUMENTS

| | | | |
|---|---|---|---|
| 2006/0055259 A1 | 3/2006 | Hanlon et al. | |
| 2012/0063918 A1* | 3/2012 | de Larminat | F16C 32/0442 417/1 |
| 2013/0221955 A1* | 8/2013 | Gatesoupe | G01B 7/30 324/207.25 |
| 2019/0219377 A1* | 7/2019 | Denk | F16C 32/0446 |
| 2021/0376775 A1* | 12/2021 | Guo | H02N 15/00 |

FOREIGN PATENT DOCUMENTS

| | | |
|---|---|---|
| CN | 108151637 A | 6/2018 |
| CN | 109742919 A | 5/2019 |
| CN | 110542487 A | 12/2019 |
| CN | 110608661 A | 12/2019 |
| CN | 111969930 A | 11/2020 |
| CN | 112729186 A | 4/2021 |
| JP | 63-188510 A | 8/1988 |
| WO | 2020/030193 A1 | 2/2020 |

\* cited by examiner

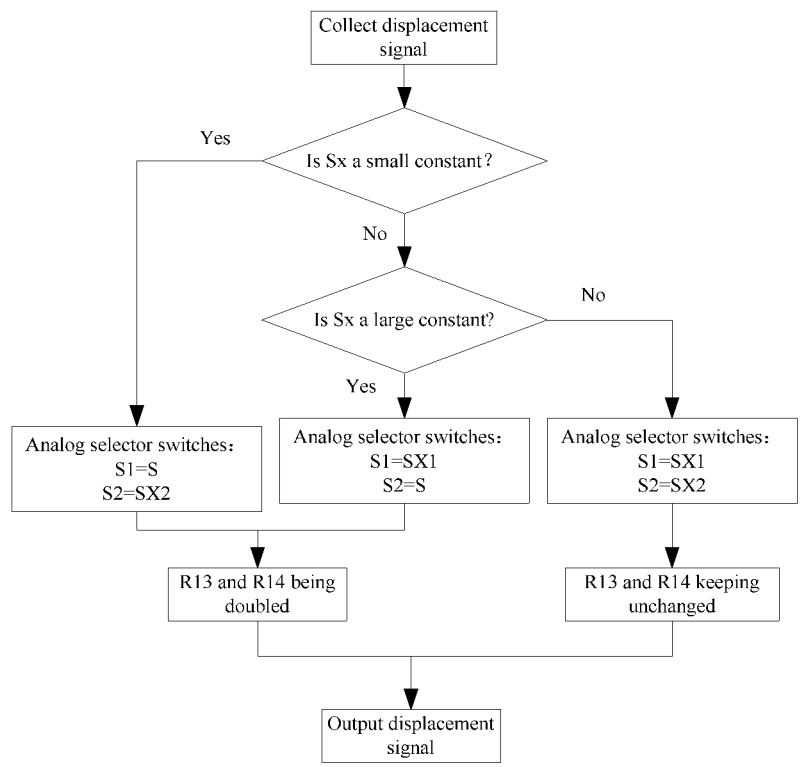

FIG. 5

A plurality of detection signals from a plurality of detection probes and a given signal of a backup probe are received, the detection probes are configured to detect a displacement value of a rotating shaft of a magnetic levitation motor to obtain the detection signals, and the backup probe is configured to replace a faulty probe among the plurality of detection probes. — S102

It is determined whether There is a faulty probe among the plurality of detection probes based on the plurality of detection signals and the given signal. — S104

The given signal of the backup probe is connected to the faulty probe corresponding to a case that a determination result is yes. — S106

FIG. 6

FAULT PROCESSING SYSTEM FOR DISPLACEMENT SENSOR

CROSS-REFERENCE TO RELATED APPLICATION

The present application is a U.S. National Stage of International Application No. PCT/CN2021/108566, filed on Jul. 27, 2021, which is based on, and claims priority of Chinese Application No. 202011523940.0, filed on Dec. 21, 2020, the disclosure of which are incorporated herein by reference in their entirety.

TECHNICAL FIELD

The present disclosure relates to the technical field of magnetic levitation motor, and particularly to a fault processing method, apparatus and system for a displacement sensor, and a processor.

BACKGROUND

The displacement sensor is one of the core components in a magnetic levitation motor system, and is the basis of a reliable and stable levitation operation of the system. Once the displacement sensor malfunctions, the magnetic levitation motor system cannot operate, or even is seriously damaged. Therefore, the reliability design of the displacement sensor is a hot topic and a technical difficulty in the art.

SUMMARY

In an aspect of the embodiments of the present disclosure, a fault processing system for a displacement sensor is provided. The fault processing system for the displacement sensor includes: a probe ring, a plurality of detecting probes and a spare probe are integrated in the probe ring, where the plurality of detecting probes are configured to detect a displacement value of a rotation shaft of a magnetic levitation motor to obtain detected signals, and the spare probe is configured to replace a faulty probe among the plurality of detecting probes; a plurality of analog selector switches connected to the probe ring, and configured to receive a plurality of detected signals from the plurality of detecting probes and a given signal of the spare probe; and a magnetic levitation bearing controller connected to the plurality of analog selector switches, and configured to determine whether there is a faulty probe among the plurality of detecting probes based on the plurality of detected signals and the given signal, wherein on a condition that a determination result is yes, the given signal of the spare probe is connected to the faulty probe, and an analog selector switch corresponding to the faulty probe is controlled to be turned off.

In some embodiments of the present disclosure, the system further includes: a differential demodulation circuit, connected to the plurality of analog selector switches, and configured to receive the plurality of detected signals and the given signal, and perform differential a demodulation processing on the plurality of detected signals based on the given signal to obtain a differential demodulated signal; and an amplification and filtering circuit, connected to the differential demodulation circuit, and configured to perform an amplification and filtering processing on the differential demodulated signal to obtain a result of the amplification and filtering processing, wherein the result of the amplification and filtering processing carries a displacement signal.

In some embodiments of the present disclosure, the magnetic levitation bearing controller is connected to the plurality of analog selector switches, and further configured to determine whether there is a faulty probe among the plurality of detecting probes based on the displacement signal to obtain the determination result.

In some embodiments of the present disclosure, the system further includes: at least two adjustable resistors, connected to the amplification and filtering circuit and the magnetic levitation bearing controller. The magnetic levitation bearing controller is further configured to increase resistance values of the adjustable resistors to target resistance values when there is a faulty probe among the plurality of detecting probes.

In some embodiments of the present disclosure, an amplitude of the differential demodulated signal is reduced to a predetermined proportion of a normal amplitude, after the given signal of the spare probe is connected to the faulty probe; and the magnetic levitation bearing controller is further configured to control the resistance values of the at least two adjustable resistors to increase to the target resistance values, and an amplification ratio of the result of the amplification and filtering processing is increased by a predetermined multiple, so that a ratio of the displacement signal to a displacement variation of the rotation shaft keeps unchanged.

In some embodiments of the present disclosure, when one of the plurality of detecting probes is the faulty probe, an inductance value and a resistance value of the faulty probe are changed, a detuning occurs in a resonance circuit including the faulty probe and a resonance capacitor, and a detected signal output by the faulty probe is changed. An output signal of the faulty probe is zero, and when an open circuit fault occurs in the faulty probe, an output waveform of the faulty probe is a triangular wave, and an amplitude of the triangular wave is smaller than a predetermined amplitude.

In another aspect of the embodiments of the present disclosure, a fault processing method for a displacement sensor is provided. The method includes: receiving a plurality of detected signals from a plurality of detecting probes and a given signal of a spare probe, wherein the detecting probes are configured to detect a displacement value of a rotation shaft of a magnetic levitation motor to obtain the detected signals, and the spare probe is configured to replace a faulty probe in the plurality of detecting probes; determining whether there is a faulty probe among the plurality of detecting probes based on the plurality of detected signals and the given signal; and connecting the given signal of the spare probe to the faulty probe corresponding to a case that a determination result is yes.

In another aspect of the embodiments of the present disclosure, a fault processing apparatus for a displacement sensor is provided. The apparatus includes: a receiving module, configured to receive a plurality of detected signals from a plurality of detecting probes and a given signal of a spare probe, wherein the detecting probes are configured to detect a displacement value of a rotation shaft of a magnetic levitation motor to obtain the detected signals, and the spare probe is configured to replace a faulty probe among the plurality of detecting probes; a determining module, configured to determine whether there is a faulty probe among the plurality of detecting probes based on the plurality of detected signals and the given signal; and a processing module, configured to connect the given signal of the spare probe to the faulty probe corresponding to a case that a determination result is yes.

In another aspect of the embodiments of the present disclosure, a non-transitory storage medium is provided. A plurality of instructions are stored on the non-transitory storage medium, and the plurality of instructions are adapted to be loaded by a processor, and perform any above-described fault processing method for the displacement sensor.

In another aspect of the embodiments of the present disclosure, a processor is provided for executing a program, wherein the program, when executed, is configured to perform any above-described fault processing method for the displacement sensor.

In another aspect of the embodiments of the present disclosure, an electronic device including a memory and a processor is provided, a computer program is stored in the memory, and the processor is configured to execute the computer program to perform any above-described fault processing method for the displacement sensor.

BRIEF DESCRIPTION OF THE DRAWINGS

The accompanying drawings illustrated herein are used to make the present disclosure to be further understood, and constitute a portion of the present disclosure. The exemplary embodiments of the present disclosure and the description thereof are used to illustrate the present disclosure, but not intended to be construed as improper limitations on the present disclosure. In the accompanying drawings:

FIG. 5 is a flowchart of fault determination control logic for a displacement sensor according to some embodiments of the present disclosure;

FIG. 6 is a flowchart of a fault processing method for a displacement sensor according to some embodiments of the present disclosure.

DETAILED DESCRIPTION OF THE EMBODIMENTS

Figure 1:
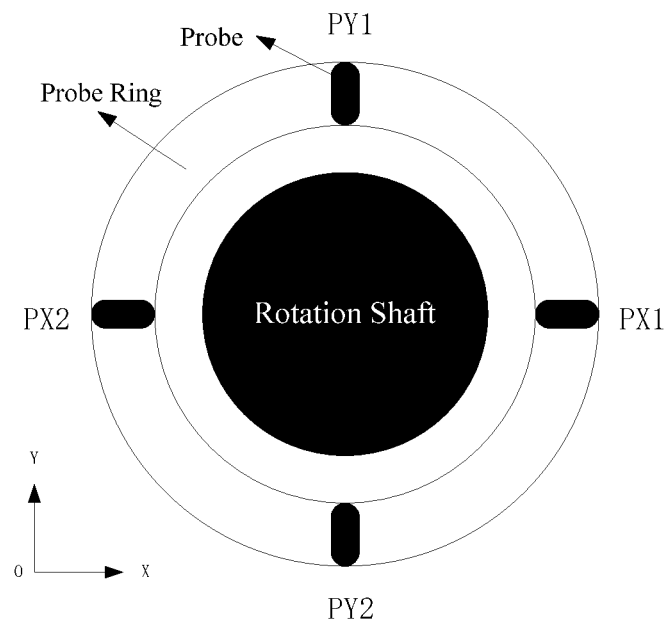
FIG. 1 is a schematic view showing a probe ring according to some embodiments of the present disclosure.

To make the solutions of the present disclosure to be better understood by those skilled in the art, the solutions of the embodiments of the present disclosure will be described clearly and completely hereinafter by combining the accompanying drawings of the embodiments of the present disclosure. Obviously, the embodiments described herein are merely some embodiments of the present disclosure, but not all embodiments. Based on the embodiments in the present disclosure, other embodiments may be obtained by a person of ordinary skill in the art without any creative efforts, and these embodiments shall fall within the scope of protection of the present disclosure.

It should be noted that the terms "first", "second" and the like, in the description, in the claims and the accompanying drawings of the present disclosure are used to distinguish similar objects, but not necessarily used to describe a particular order or sequence. It should be understood that the data used herein are interchangeable under appropriate conditions, so that the embodiments of the present disclosure described herein can be implemented in an order other than those illustrated or described herein. In addition, the terms "comprising" and "having", as well as any variations thereof, are intended to cover a non-exclusive inclusion, for example, a process, a method, a system, a product, or an apparatus that includes a series of steps or units, and are not necessarily limited to those steps or units expressly listed, but may include other steps or units not expressly listed or inherent to such a process, a method, a product, or an apparatus.

In the related art, there is a magnetic bearing sensor control system having a fault-tolerant function, but the magnetic bearing sensor control system uses software to perform differential operation, the software occupies CPU core resources and has low real-time performance In the related art, there is also a treble-redundancy-controlled radial displacement sensor assembly for a magnetic levitation bearing and a control method thereof, which may reduce fault of the sensor assembly. However, since three displacement sensor probes need to be installed in each direction of a probe ring, the structure is complex, and cannot satisfy a miniaturization application.

In view of the above problems, an effective solution has not been proposed yet in the related art.

The embodiments of the present disclosure provide a fault processing method, apparatus and system for a displacement sensor, and a processor, so as to at least solve the technical problem in the related art that the magnetic levitation motor system cannot operate or is even damaged due to the fault of the displacement sensor.

Embodiments of First Type

In some embodiments of the present disclosure, a fault processing system for a displacement sensor is provided. The fault processing system for the displacement sensor includes: a probe ring, a plurality of analog selector switches, and a magnetic levitation bearing controller.

The probe ring is disposed inside the displacement sensor, and a plurality of detecting probes and a spare probe are integrated in the probe ring. The detecting probes are configured to detect a displacement value of a rotation shaft of a magnetic levitation motor to obtain detected signals, and the spare probe is configured to replace a faulty probe among the plurality of detecting probes. The plurality of analog selector switches are connected to the probe ring, and configured to receive a plurality of detected signals from the plurality of detecting probes and a given signal of the spare probe. The magnetic levitation bearing controller is connected to the plurality of analog selector switches, and configured to determine whether there is a faulty probe among the plurality of detecting probes based on the plurality of detected signals and the given signal. Corresponding to a case that a determination result is yes, the given signal of the spare probe is connected to the faulty probe, and an analog selector switch corresponding to the faulty probe is controlled to be turned off.

In some embodiments of the present disclosure, the probe ring is disposed inside the displacement sensor, and the plurality of detecting probes and the spare probe are integrated in the probe ring. The detecting probes are configured to detect the displacement value of the rotation shaft of the magnetic levitation motor to obtain the detected signals, and the spare probe is configured to replace a faulty probe among the plurality of detecting probes. The plurality of analog selector switches are connected to the probe ring, and configured to receive the plurality of detected signals from the plurality of detecting probes and the given signal of the spare probe. The magnetic levitation bearing controller is connected to the plurality of analog selector switches, and configured to determine whether there is a faulty probe among the plurality of detecting probes based on the plurality of detected signals and the given signal. Corresponding to the case that the determination result is yes, the given signal of the spare probe is connected to the faulty probe, and the analog selector switch corresponding to the faulty probe is controlled to be turned off. The purpose of timely and effectively solving the fault of the displacement sensor is achieved, thereby achieving the technical effect of ensuring the normal operation of the magnetic levitation motor system, and further solving the technical problem in the related art that the magnetic levitation motor system cannot operate or is even damaged due to the fault of the displacement sensor.

It should be noted that the displacement sensor in the embodiments of the present disclosure may be an eddy current displacement sensor, and may be, but is not limited to be, applied in a magnetic levitation motor system. In this technical field, a magnetic levitation motor system stably levitates a rotation shaft in a space by means of an electromagnetic force, thereby achieving a frictionless and high-speed operation.

Specifically, a working process of the magnetic levitation motor system includes detecting the displacement value of the rotation shaft of the magnetic levitation motor in real time by the displacement sensor, and transmitting the displacement signal to the bearing controller. When under an action of an impact force, the rotation shaft deviates from a central position, and the bearing controller generates a corresponding control current quickly, and the magnetic bearing generates a corresponding control force to force the rotation shaft to return to the central position.

In some embodiments of the present disclosure, the displacement sensor in the magnetic levitation motor system is generally an eddy current displacement sensor, which includes a probe and a signal processing circuit. As shown in FIG. 1, the magnetic levitation motor system needs to control five degrees of freedom in directions of the rotation shaft including front radial X and Y directions, rear radial X and Y directions, and an axial direction. The displacement of each degree of freedom needs to be detected by the displacement sensor. In order to eliminate the influence of the ambient temperature change on the displacement detection to improve the detection accuracy, two probes are generally arranged for each degree of freedom. A differential demodulation is firstly performed on the two probe signals to extract a signal quantity only related to the displacement change, and then an amplification and filtering processing is performed. In this case, not only the sensor accuracy can be improved, but also the signal processing circuits are reduced. Therefore, the magnetic levitation motor system needs to be provided with ten displacement sensor probes and five signal processing circuits in total.

However, the ten sensor probes are arranged inside the magnetic levitation motor, as long as one of the sensor probes is damaged, the magnetic levitation motor system will fail to operate, therefore, the reliability of the design of the displacement sensor is very important.

Therefore, some embodiments of the present disclosure provides a novel displacement sensor having a redundancy design. Based on the redundancy design of the displacement sensor, the displacement sensor mainly includes the probe ring of the sensor, includes the plurality of detecting probes, the spare probe and the displacement signal processing circuits, which are integrated in the probe ring to detect the displacement of the rotation shaft. The displacement signal processing circuit includes a displacement fault determination control logic circuit and a displacement signal automatic switching circuit. The structure of the displacement sensor provided in the present disclosure is simple and convenient to implement, so that the reliability of the displacement sensor may be greatly improved, and the technical problem that the magnetic levitation motor system cannot operate or is even damaged due to the fault of the displacement sensor is solved.

The probe redundancy design schemes of the displacement sensor provided by the embodiments of the present disclosure are illustrated hereinafter through some specific embodiments of the present disclosure.

Figure 2:
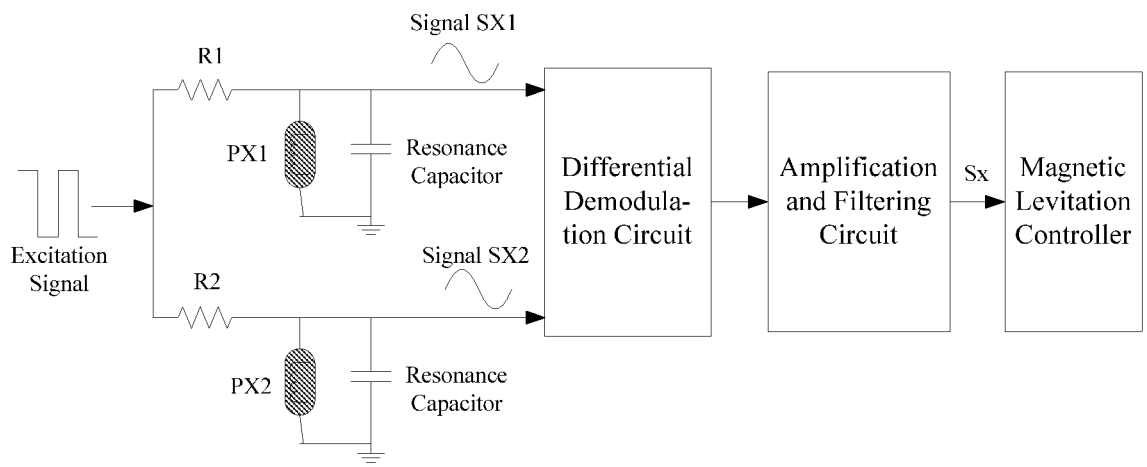
FIG. 2 is a schematic circuit diagram of a fault processing system for a displacement sensor according to some embodiments of the present disclosure.

Taking a radial probe ring of a magnetic levitation motor system as an example, as shown in FIG. 2, five probes are arranged in the probe ring, probes PX1 and PX2 are configured to detect an X-directional displacement of a rotation shaft, and probes PY1 and PY2 are configured to detect a Y-directional displacement of the rotation shaft, and parameters of the four probes are identical. When the rotation shaft is located at the center, the rotation shaft is at the same distance from the four probes PX1, PX2, PY1, and PY2, and output signals of the four probes are identical, and denoted as S0.

Figure 3:
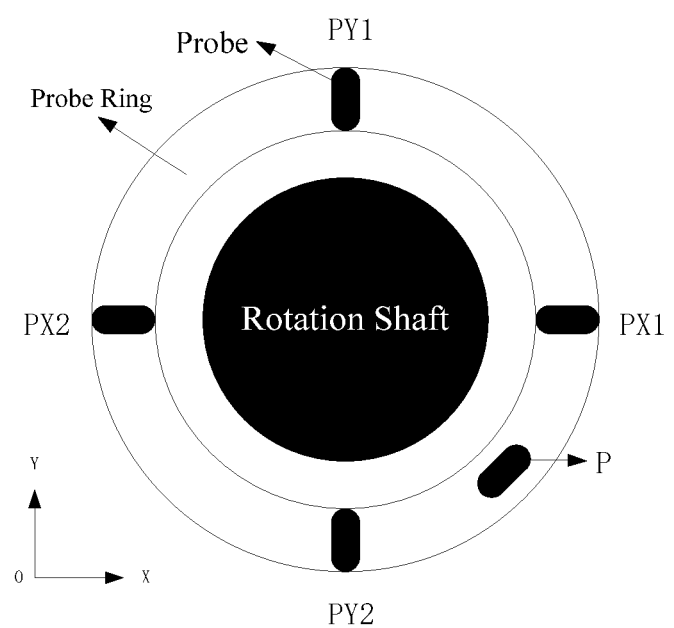
FIG. 3 is a schematic view showing the probe ring according to other embodiments of the present disclosure.

As shown in FIG. 3, in the embodiments of the present disclosure, a spare probe P is arranged in the probe ring, and the probe P is sealed in the probe ring and is not used to detect the displacement of the rotation shaft. The spare probe P is configured to automatically replace a damaged or faulty probe once one of the four probes PX1, PX2, PY1 and PY2 is damaged or faulty, and a configuration of an output parameter of the spare probe P needs to satisfy the condition that the output signal is a given signal S, and is a constant S0.

Figure 4:
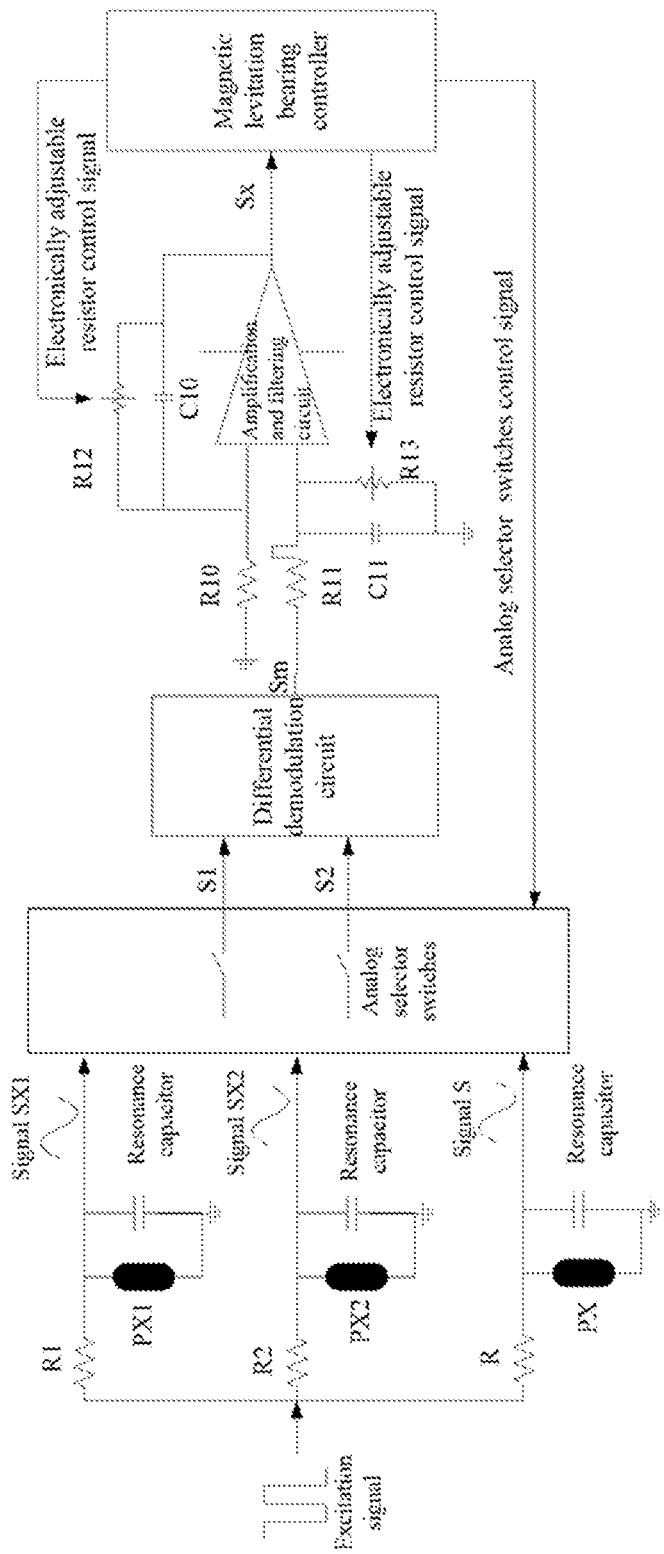
FIG. 4 is a schematic circuit diagram of the fault processing system for the displacement sensor according to other embodiments of the present disclosure.

In some embodiments of the present disclosure, the displacement fault determination control logic and the displacement signal automatic switching circuit in the embodiments of the present disclosure are mainly shown in FIG. 4, and the working process thereof is described in detail by taking a displacement detection in the X direction through the two detecting probes (PX1, PX2) as an example.

In the embodiments of the present disclosure, analog selector switches are added before the differential demodulation circuit, two electronically adjustable resistors R12 and R13 are added for the amplification and filtering circuit (op-amp circuit). The analog selector switches and the adjustable resistors R12 and R13 are controlled by the magnetic levitation bearing controller, and inputs of the analog selector switches are the detected signals SX1 and SX2 of the detecting probes PX1 and PX2 and the given signal S of the spare probe P.

In some embodiments of the present disclosure, as shown in FIG. 4, the system further includes: a differential demodulation circuit connected to the plurality of analog selector switches, and configured to receive the plurality of detected signals and the given signal, and perform a differential demodulation processing on the plurality of detected signals based on the given signal to obtain a differential demodulated signal; and an amplification and filtering circuit connected to the differential demodulation circuit, and configured to perform an amplification and filtering processing on the differential demodulated signal to obtain a result of the amplification and filtering processing. The result of the amplification and filtering processing carries a displacement signal.

In some embodiments of the present disclosure, the magnetic levitation bearing controller is connected to the plurality of analog selector switches, and further configured to determine whether there is a faulty probe among the plurality of detecting probes based on the displacement signal to obtain the determination result.

In some embodiments of the present disclosure, specific examples corresponding to the detecting probe in a normal state and examples corresponding to the detecting probe in a faulty state are described hereinafter. To understand the exemplary examples corresponding to the faulty state, the exemplary examples corresponding to the normal state are firstly described below. When the detecting probe PX1 and the detecting probe PX2 are in normal states, the magnetic levitation bearing controller controls the analog selector switches to be on, so that a detected signal 51 outputted by the detecting probe PX1 is SX1, and a detected signal S2 outputted by the detecting probe PX2 is SX2. When the rotation shaft of the magnetic levitation motor deviates from the center position to the X direction by Δx, the signals SX1=S0+Δs and SX2=S0−Δs are processed by the differential demodulation circuit to obtain the differential demodulated signal Sm=2Δs, and then the differential demodulated signal is amplified and filtered by the amplification and filtering circuit to obtain the displacement signal Sx, and the displacement signal Sx is transmitted to the magnetic levitation bearing controller.

In some embodiments of the present disclosure, the system further includes: at least two adjustable resistors connected to the amplification and filtering circuit and the magnetic levitation bearing controller. The magnetic levitation bearing controller is further configured to increase resistance values of the adjustable resistors to target resistance values when there is a faulty probe among the plurality of detecting probes.

In some embodiments of the present disclosure, when one of the plurality of detecting probes is the faulty probe, an inductance value and a resistance value of the faulty probe are changed, and a detuning occurs in a resonance circuit including the faulty probe and a resonance capacitor, and a detected signal outputted by the faulty probe is changed, and the output signal of the faulty probe is zero. When an open circuit fault occurs in the faulty probe, an output waveform of the faulty probe is a triangular wave, and an amplitude of the triangular wave is smaller than a predetermined amplitude.

In other embodiments of the present disclosure, when one of the two detecting probes is faulty (e.g., the probe is short-circuited or open-circuited), the inductance and resistance of the faulty probe are drastically changed, and the detuning occurs in the resonant circuit including the probe and the resonant capacitor, and the amplitude, phase and waveform of the output signal of the faulty probe are all changed. When the detecting probe has a short-circuited fault, the output signal is 0. When the detecting probe has an open-circuited fault, the output waveform is a triangular wave, and the amplitude of such a triangular wave is much smaller than the amplitude of the triangular wave in the normal state.

In some embodiments of the present disclosure, an amplitude of the differential demodulated signal is reduced to a predetermined proportion of a normal amplitude, after the given signal of the spare probe is connected to the faulty probe. The magnetic levitation bearing controller is further configured to control the resistance values of at least two adjustable resistors to increase to the target resistance values, and an amplification ratio of the amplification and filtering processing result is increased by a predetermined multiple, so that a ratio of the displacement signal to a displacement variation of the rotation shaft keeps unchanged.

In the displacement fault determination control logic of the displacement sensor provided in some embodiments of the disclosure, referring to FIG. 5, when the detecting probe PX1 is faulty, the signal SX1 is a small value, and the Sm obtained by the differential demodulation is also a small value, so that the displacement signal Sx inputted to the magnetic levitation bearing controller continues to be a low value. After several sampling periods, the magnetic levitation bearing controller may determine that the detecting probe PX1 is faulty. At this time, the magnetic levitation bearing controller controls the analog selector to switch to connect the given signal S of the spare probe P to S1, and the signal of S2 is still SX2. Since the given signal S is the constant S0 and is not affected by the displacement of the rotation shaft, at this time, the amplitude of the signal Sm=Δs obtained by the differential demodulation is a half less than the amplitude of the signal in the normal state. At this time, the magnetic levitation bearing controller controls the adjustable resistors R13 and R12 to be doubled, so that the amplification ratio of the operational amplifier is doubled, thereby ensuring that the ratio of the output signal Sx to the displacement variation keeps unchanged, and achieving a normal detection operation of the displacement sensor even if one of the two detecting probes is damaged or faulty.

In other embodiments of the present disclosure, still referring to FIG. 5, when the detecting probe PX2 is faulty, the signal SX2 is a relatively small value, and Sm obtained by differential demodulation is a relatively large value, so that the displacement signal Sx inputted to the magnetic levitation bearing controller continues to be a relatively high value. After several sampling periods, the magnetic levitation bearing controller may determine that the probe PX2 is faulty, and at this time, the signal S of the spare probe P is connected to S2. A subsequent processing is the same as the processing method when the detecting probe PX1 is fault.

Embodiments Second Type

According to an embodiment of the present disclosure, a fault processing method for a displacement sensor is provided. It should be noted that the steps shown in the flowchart of the accompanying drawings may be performed in a computer system including such as a set of computer-executable instructions, and that although a logical sequence is shown in the flowchart, in some cases the shown or described steps may be performed in an order different from that described herein.

FIG. 6 is a flowchart of a fault processing method for a displacement sensor according to some embodiments of the present disclosure. As shown in FIG. 6, the method includes the following steps.

At step S102, a plurality of detected signals from a plurality of detecting probes and a given signal of a spare probe are received. The detecting probes are configured to detect a displacement value of a rotation shaft of a magnetic levitation motor to obtain the detected signals, and the spare probe is configured to replace a faulty probe among the plurality of detecting probes.

At step S104, it is determined whether there is a faulty probe among the plurality of detecting probes based on the plurality of detected signals and the given signal.

At step S106, the given signal of the spare probe is connected to the faulty probe corresponding to a case that a determination result is yes.

In the embodiments of the present disclosure, the plurality of detected signals from the plurality of detecting probes and the given signal of the spare probe are received. The detecting probes are configured to detect the displacement value of the rotation shaft of the magnetic levitation motor to obtain the detected signals, and the spare probe is configured to replace the faulty probe among the plurality of detecting probes. It is determined whether there is a faulty probe among the plurality of detecting probes based on the plurality of detected signals and the given signal. The given signal of the spare probe is connected to the faulty probe corresponding to the case that the determination result is yes. The purpose of timely and effectively solving the fault of the displacement sensor is achieved, thereby achieving the technical effect of ensuring the normal operation of the magnetic levitation motor system, and further solving the technical problem in the related art that the magnetic levitation motor system cannot operate or is even damaged due to the fault of the displacement sensor.

It should be noted that any fault processing methods for the displacement sensor in the embodiments of the present disclosure may be executed or implemented in the displacement sensor provided in the embodiments of the first type.

In addition, it should be noted that an alternative example of the present embodiment may refer to the related description of the embodiments of the first type, and they are not described repeatedly herein.

Embodiments of Third Type

Figure 7:
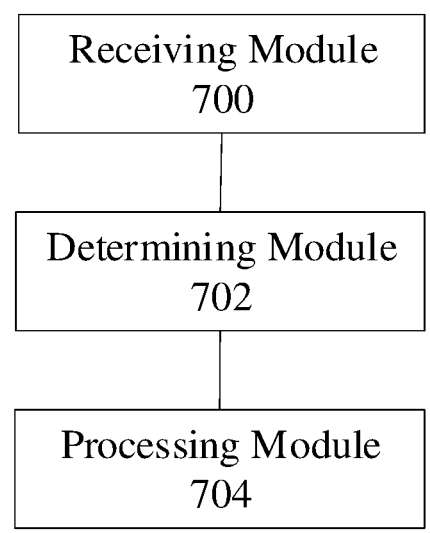
FIG. 7 is a schematic structural view showing a fault processing apparatus for a displacement sensor according to some embodiments of the present disclosure.

According to an embodiment of the present disclosure, an embodiment of an apparatus for implementing the above fault processing method for the displacement sensor is further provided. FIG. 7 is a schematic structural view showing a fault processing apparatus for a displacement sensor according to some embodiments of the present disclosure. As shown in FIG. 7, the fault processing apparatus for the displacement sensor includes a receiving module 700, a determining module 702, and a processing module 704.

The receiving module 700 is configured to receive a plurality of detected signals from a plurality of detecting probes and a given signal of a spare probe. The detecting probes are configured to detect a displacement value of a rotation shaft of a magnetic levitation motor to obtain the detected signals, and the spare probe is configured to replace a faulty probe among the plurality of detecting probes. The determining module 702 is configured to determine whether there is a faulty probe among the plurality of detecting probes based on the plurality of detected signals and the given signal. The processing module 704 is configured to connect the given signal of the spare probe to the faulty probe corresponding to a case that a determination result is yes.

In the embodiments of the present disclosure, the plurality of detected signals from the plurality of detecting probes and the given signal of the spare probe are received. The detecting probes are configured to detect the displacement value of the rotation shaft of the magnetic levitation motor to obtain the detected signals, and the spare probe is configured to replace the faulty probe among the plurality of detecting probes. It is determined whether there is a faulty probe among the plurality of detecting probes based on the plurality of detected signals and the given signal. The given signal of the spare probe is connected to the faulty probe corresponding to the case that the determination result is yes. The purpose of timely and effectively solving the fault of the displacement sensor is achieved, thereby achieving the technical effect of ensuring the normal operation of the magnetic levitation motor system, and further solving the technical problem in the related art that the magnetic levitation motor system cannot operate or is even damaged due to the fault of the displacement sensor.

It should be noted that the modules above may be implemented by software or hardware, for example, the later may be implemented in such a manner that all modules may be located in the same processor, or that all modules may be located in different processors by means of any combination.

It should be noted that the receiving module 700, the determining module 702, and the processing module 704 correspond to the steps S102 to S106 in the embodiments of the second type, and the examples and application scenarios of the modules are the same as those of the corresponding steps, but are not limited to the contents disclosed in the embodiments of the first type and the embodiments of the second type above. It should be noted that the modules, as parts of the apparatus, may be performed in a computer terminal.

It should be noted that an alternative example of the present embodiment may refer to the related description of the embodiments of the first type, and they are not described repeatedly herein.

The fault processing apparatus for the displacement sensor may further include a processor and a memory. The receiving module 700, the determining module 702, and the processing module 704 are all stored in the memory as program units, and the processor executes the program units stored in the memory to perform corresponding functions.

The processor includes a kernel, and corresponding program units are called from the memory by the kernel. One or more kernels may be provided. The memory may include a computer readable medium, such as non-permanent memory, random access memory (RAM) and/or non-transitory memory, for example read only memory (ROM) or flash memory (flash RAM). The memory includes at least one memory chip.

In the embodiments of the present disclosure, a non-transitory storage medium is also provided. In some embodiments of the present disclosure, the non-transitory storage medium includes a stored program. The program, when executed, controls the device on which the non-transitory storage medium is located to perform any one of the fault processing methods for the displacement sensor.

In some embodiments, the non-transitory storage medium may be located in any one of computer terminals of a computer terminal group in a computer network, or located in any one of mobile terminals of a mobile terminal group. The non-transitory storage medium includes a stored program.

In some embodiments of the present disclosure, the program, when executed, controls the device on which the non-transitory storage medium is located to perform following functions: receiving a plurality of detected signals from a plurality of detecting probes and a given signal of a spare probe, where the detecting probes are configured to detect a displacement value of a rotation shaft of a magnetic levitation motor to obtain the detected signals, and the spare probe is configured to replace a faulty probe among the plurality of detecting probes; determining whether there is a faulty probe among the plurality of detecting probes based on the plurality of detected signals and the given signal; and connecting the given signal of the spare probe to the faulty probe corresponding to the case that a determination result is yes.

According to some embodiments of the present disclosure, a processor is further provided. In some embodiments of the present disclosure, the processor is configured to execute a program. The program, when executed, performs any one of the fault processing methods for the displacement sensor.

According to some embodiments of the present disclosure, an electronic device is further provided. The electronic device includes a memory in which a computer program is stored, and a processor. The processor is configured to execute the computer program to perform any one of the fault processing methods for the displacement sensor.

According to some embodiments of the present disclosure, a computer program product is further provided. The computer program product, when executed in a data processing apparatus, is applicable for executing the program having steps of any one of the fault processing methods for the displacement sensor initialized thereon.

In the embodiments of the present disclosure, the plurality of detecting probes and the spare probe are integrated in the probe ring. The detecting probes are configured to detect the displacement value of the rotation shaft of the magnetic levitation motor to obtain the detected signals, and the spare probe is configured to replace the faulty probe among the plurality of detecting probes. The plurality of analog selector switches are connected to the probe ring, and configured to receive the plurality of detected signals from the plurality of detecting probes and the given signal of the spare probe. The magnetic levitation bearing controller is connected to the plurality of analog selector switches, and configured to determine whether there is a faulty probe among the plurality of detecting probes based on the plurality of detected signals and the given signal. Corresponding to the case that the determination result is yes, the given signal of the spare probe is connected to the faulty probe, and the analog selector switch corresponding to the faulty probe is controlled to be turned off. The purpose of timely and effectively solving the fault of the displacement sensor is achieved, thereby achieving the technical effect of ensuring the normal operation of the magnetic levitation motor system, and further solving the technical problem in the related art that the magnetic levitation motor system cannot operate or is even damaged due to the fault of the displacement sensor.

The serial numbers of the disclosed embodiments are merely used for the purpose of description but do not represent advantages or disadvantages of the embodiments.

In the embodiments of the present disclosure above, the description of each embodiment has its own emphasis, and for parts not described in detail in a certain embodiment, reference may be made to the related description of other embodiments.

In various embodiments provided by the present disclosure, it should be understood that the disclosed technology may be implemented in other ways. The above-described apparatus embodiments are merely illustrative. For example, the division of the above-described units may be a logical functional division, and there may be other division manners in an actual implementation, for example, a plurality of units or components may be combined or integrated into another system, or some features may be ignored or not performed. In addition, the shown or discussed mutual coupling or direct coupling or communication connection may be an indirect coupling or communication connection through some interfaces, units or modules, and may be in electrical or other forms.

The units described as separate components may be physically separate or not, and the components illustrated as units may be physical units or not, that is, they may be located at one position, or they may be distributed to a plurality of units. Some or all of the units may be selected according to actual needs to achieve the objective of the solutions of the embodiments.

In addition, each functional unit in various embodiments of the present disclosure may be integrated into one processing unit, or each unit may exist alone physically, or two or more units may be integrated into one unit. The above-mentioned integrated units may be implemented in the form of hardware or software functional units.

The integrated unit described may be stored in a computer readable non-transitory storage medium if implemented as a software functional unit and sold or used as an independent product. Based on such an understanding, the essential of the technical solutions of the present disclosure or the contributing part thereof for the related art, or all or part of the technical solutions, may be embodied in the form of a software product. The software product is stored in a non-transitory storage medium, and includes several instructions for causing a computer device (which may be a personal computer, a server, a network device, or the like) to perform all or part of the steps of the above-described methods of the various embodiments of the present disclosure. The non-transitory storage medium includes various mediums capable of storing program codes, such as a U disk, a read-only memory (ROM), a random access memory (RAM), a removable hard disk, a magnetic disk, or an optical disk.

What disclosed above are merely some embodiments of the present disclosure. It should be noted that several modifications and embellishments may be made by those of ordinary skill in the art without departing from the principles of the present disclosure, and these modifications and embellishments are also considered to be within the protection scope of the present disclosure.

What is claimed is:

1. A fault processing system for a displacement sensor, comprising:
   a probe ring, wherein a plurality of detecting probes and a spare probe are integrated in the probe ring, the detecting probes are configured to detect a displacement value of a rotation shaft of a magnetic levitation motor to obtain detected signals;
   a plurality of analog selector switches, connected to the probe ring, and configured to receive a plurality of detected signals from the plurality of detecting probes and a given signal of the spare probe;
   a magnetic levitation bearing controller, connected to the plurality of analog selector switches, and configured to determine whether there is a faulty probe among the plurality of detecting probes based on the plurality of detected signals and the given signal, wherein corresponding to a case that a determination result is yes, the magnetic levitation bearing controller is configured to connect the given signal of the spare probe to the faulty probe, and control an analog selector switch among the plurality of analog selector switches corresponding to the faulty probe to be turned off;
   a differential demodulation circuit, connected to the plurality of analog selector switches, and configured to receive the plurality of detected signals and the given signal, and perform a differential demodulation processing on the plurality of detected signals based on the given signal to obtain a differential demodulated signal;

an amplification and filtering circuit, connected to the differential demodulation circuit, and configured to perform an amplification and filtering processing on the differential demodulated signal to obtain a result of the amplification and filtering processing, wherein the result of the amplification and filtering processing carries a displacement signal; and at least two adjustable resistors, connected to the amplification and filtering circuit and the magnetic levitation bearing controller;

wherein the magnetic levitation bearing controller is further configured to increase resistance values of the adjustable resistors to target resistance values when there is a faulty probe among the plurality of detecting probes.

2. The system of claim 1, wherein
the magnetic levitation bearing controller is connected to the plurality of analog selector switches, and further configured to determine whether there is a faulty probe among the plurality of detecting probes based on the displacement signal to obtain the determination result.

3. The system of claim 1, wherein
the magnetic levitation bearing controller is configured to reduce an amplitude of the differential demodulated signal to a predetermined proportion of a normal amplitude, after the given signal of the spare probe is connected to the faulty probe; and the magnetic levitation bearing controller is further configured to control the resistance values of the at least two adjustable resistors to increase to the target resistance values, and configured to increase an amplification ratio of the result of the amplification and filtering processing by a predetermined multiple, so that a ratio of the displacement signal to a displacement variation of the rotation shaft keeps unchanged.

* * * * *